March 11, 1952 J. HELLER 2,588,721
POWER TAKE-OFF DEVICE FOR WHEELED TRACTORS
Filed May 11, 1949 2 SHEETS—SHEET 1
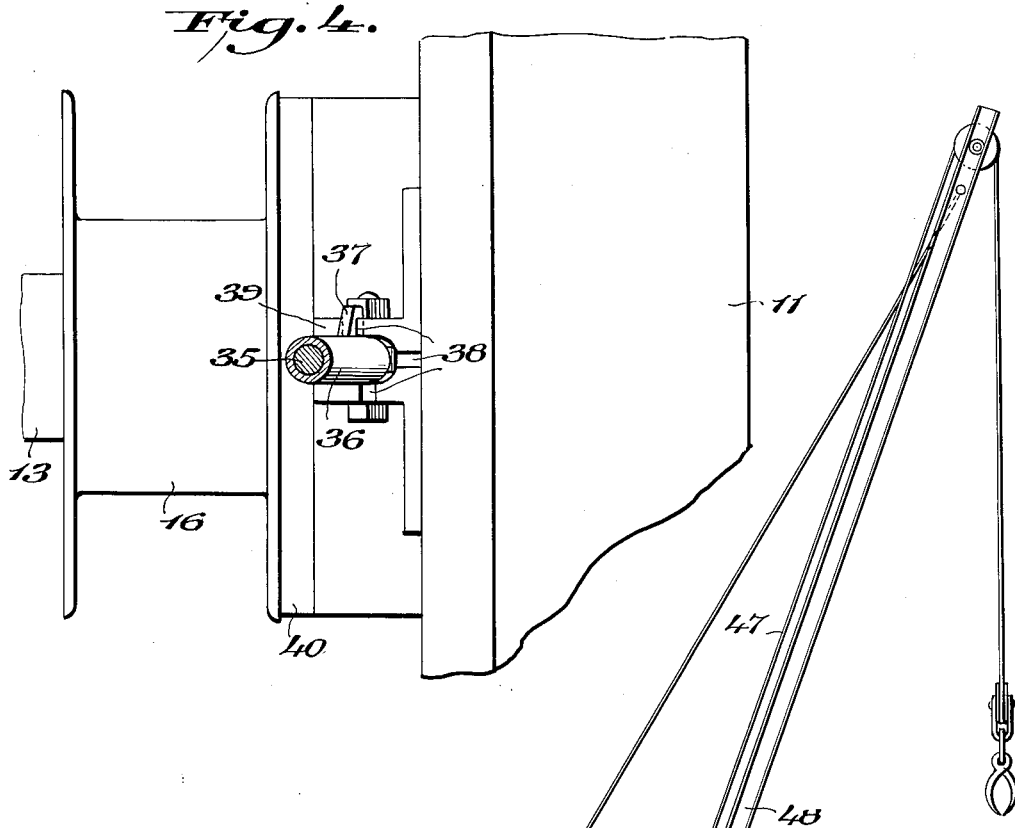
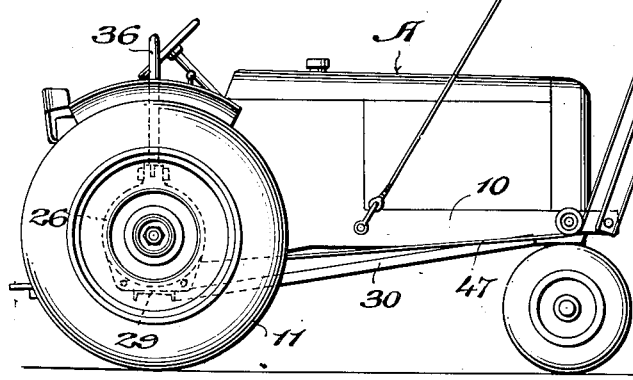
INVENTOR.
Julius Heller,
BY
Carroll Bailey,
ATTORNEY INVENTOR.
Julius Heller,
BY
Carroll Bailey
ATTORNEY Patented Mar. 11, 1952

2,588,721

UNITED STATES PATENT OFFICE 2,588,721

POWER TAKE-OFF DEVICE FOR WHEELED TRACTORS

Julius Heller, Portsmouth, Va.

Application May 11, 1949, Serial No. 92,549

8 Claims. (Cl. 254—166)

1

This invention relates to power take-off devices for tractors of the wheeled type, and has for its general object to provide a simple, practical power take-off device which may readily and easily be installed upon tractors of known wheeled types and which derives its power directly from the live rear axle of a tractor upon which it is installed, whereby the tractor engine and the conventional power transmission and control mechanism of the tractor advantageously are utilized for the operation of said device.

More particularly, a special object of the invention is to provide a power take-off device for tractors of the wheeled type which may readily and advantageously be mounted inwardly with respect to a rear wheel of a tractor in a manner to derive its power directly from a live rear axle of the tractor, which may readily and easily be employed to establish or deny a driving connection between either the tractor wheel or a cable drum or the like constituting part of the device, and which is designed for installation in a manner so that strains due to operation of the cable drum or the like are transmitted primarily to the rugged frame of the tractor rather than to other parts of the tractor that are less able to sustain them.

With the foregoing and other objects in view, which will become more fully apparent as the nature of the invention is better understood, the same consists in a power take-off device for tractors embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a side elevation of a tractor equipped with a power take-off device in accordance with the invention.

Fig. 4 is a horizontal section on an enlarged scale on the line 4—4 of Fig. 3.

Figure 2:
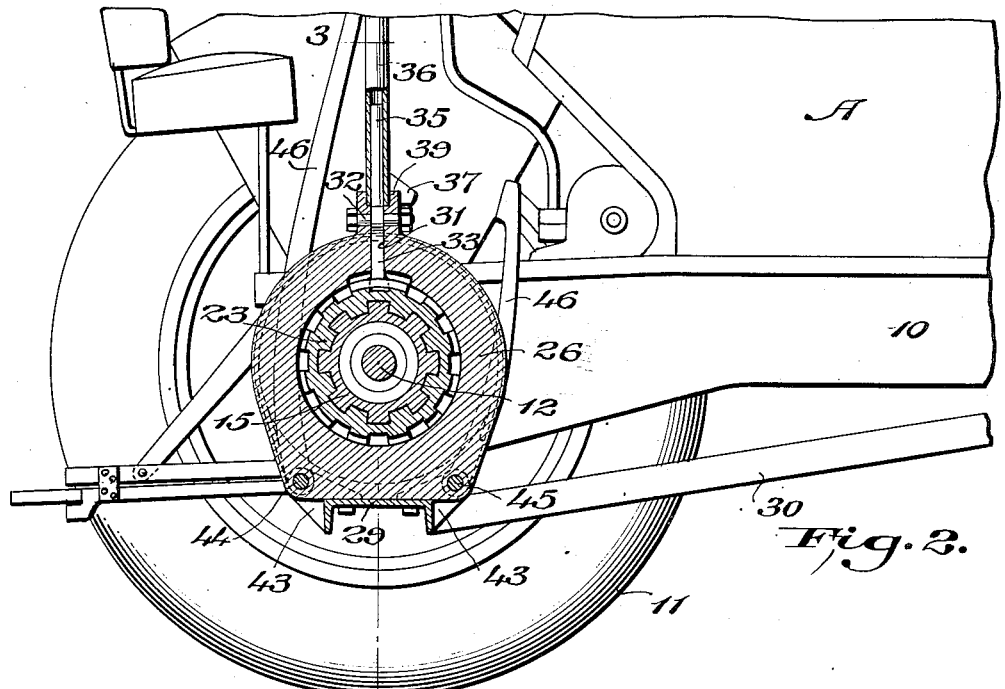
Fig. 2 is a longitudinal section on an enlarged scale through the rear portion of the tractor shown in Fig. 1.

Referring to the drawings in detail, A designates, generally, a tractor of a well known type with which the present invention is concerned, said tractor including, as usual, a frame 10, rear drive wheels 11, 11, live rear axles 12, 12, and housings 13, 13 for said axles bolted to and extending laterally from opposite sides of a casing 14 containing, as is understood, gearing through which power is transmitted from the engine of the tractor to said live rear axles 12, 12.

Figure 3:
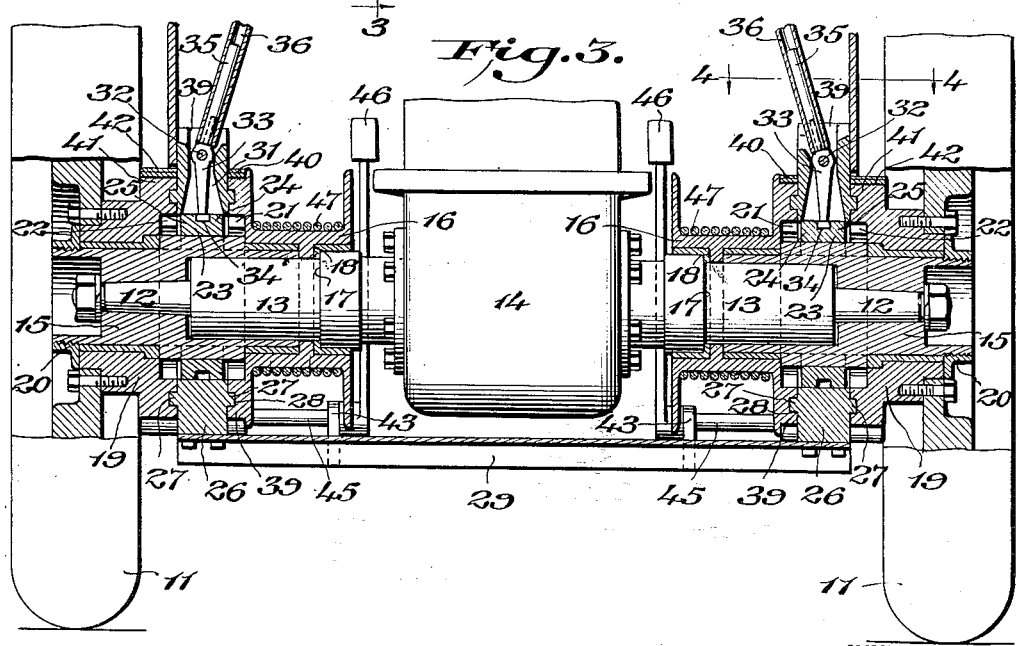
Fig. 3 is a vertical, transverse section on the line 3—3 of Fig. 2.

In accordance with the present invention, any given tractor of the general type illustrated may be equipped with only one of the present power take-off devices which may be related to either of the rear wheels 11 and its associated live axle 12. Preferably, however, any given tractor such as illustrated is equipped with two of the present power take-off devices, each related to one of the rear wheels 11 and its associated live axle 12, as illustrated in Fig. 3 of the drawings.

The outer end portions of the axles 12 extend beyond the outer ends of the housings 13 and ordinarily have the wheels 11 fixed thereon for rotation therewith. However, in accordance with the present invention, instead of the wheels 11 being fixed to the axles 12, drive members 15 are fixed to said axles for rotation therewith and the wheels 11 are mounted upon said drive members for rotation relative thereto.

Engaged over and suitably journaled upon the axle housings 13 for rotation about the same are cable drums 16 which are limited as to inward movement along said housings in any suitable manner as, for example, by means of outwardly facing shoulders 17 on said housings cooperating with inwardly facing shoulders 18 on said drums.

The wheels 11 are rotatably mounted on the drive members 15 by means of hub elements 19 to which said wheels are bolted or otherwise suitably fixed and which are journaled upon said drive members, said wheels being held on said drive members by means of nuts 20 or their equivalents threaded or otherwise suitably fastened upon the outer end portions of said drive members.

At their outer sides the cable drums 16 are provided with suitable clutch formations such as teeth 21, while at their inner sides the hub elements 19 are provided with suitable clutch formations such as teeth 22. Each of the hub elements 19 is suitably spaced outwardly from its related cable drum 16 and on each of the drive members 15, between the cable drum 16 and the hub element 19, is splined a shiftable clutch element 23 which is provided at its inner end with clutch formations 24 for cooperation with the clutch formations 21 of the related cable drum 16 and at its outer end with clutch formations 25 for cooperation with the clutch formations 22 of the related hub element 19.

The clutch elements 23 are of lengths such that they may occupy central or neutral positions in which they do not serve to couple either the cable drums 16 or the hub elements 19 to the drive members 15. The said drive members 15 then are free to rotate without rotating either the cable drums 16 or the hub elements 19. However, from their central or neutral positions, the clutch elements 23 are shiftable either inwardly to engage their clutch formations 24 with the clutch formations 21, or outwardly to engage their clutch formations 25 with the clutch formations 22. Thus, by shifting either of the clutch elements 23 inwardly from its neutral position it will serve to establish a driving connection between the related drive member 15 and the related cable drum 16, while by shifting either of said clutch elements outwardly from its neutral position it will serve to establish a driving connection between the related drive member 15 and the related hub element 19 and, hence, the related wheel 11. It will thus be seen that by means of the present power take-off devices, the tractor engine may be rendered effective to drive both of the wheels of the tractor without driving either of the cable drums 16, or to drive both of the cable drums without driving either wheel of the tractor, or to drive either of the cable drums without driving the other, or to drive either of the tractor wheels without driving the other, or to drive the cable drum at either side of the tractor and simultaneously drive the tractor wheel at the opposite side of the tractor, all of which is highly advantageous in many instances where cable operations are combined with tractor movements either at separate times or simultaneously.

Interposed between each of the cable drums 16 and its related hub element 19 is a sturdy ring-like casing 26 which encloses and protects the related clutch element 23 and which has annular ribs 27 at its inner and its outer sides engaged in annular recesses 28 in the adjacent sides of the related cable drum 16 and hub element 19, respectively. Thus, each casing 26 assists materially in maintaining all parts of its related power take-off device in axial alinement with each other. To further assist in the accomplishment of this purpose, the inner end portion of each drive member 15 may extend over and be journaled upon the outer end portion of the related housing 13, and the outer end portion of each cable drum 16 may extend over and be journaled upon the inner end portion of the related drive member 13.

A cross member 29 of channel or other suitable form connects the two casings 26 together at their bottoms, and radius rods 30 at either side of the tractor connect either said cross member or said casings 26 to front portions of the main frame of the tractor. Thus, strains due to cable pulling forces exerted by the drums 16 are substantially entirely transmitted through the casings 26 and the rods 30 to the sturdy main frame of the tractor and thereby the axles 12 and their housings 13 are substantially entirely relieved of such strains.

In the top portion of each of the casings 26 is a recess 31 wherein is pivotally mounted for inward and outward swinging movement, as indicated at 32, an arm 33 for shifting the related clutch element 23. Each arm 33 extends downwardly from its pivot 32 and at its lower end is engaged in an annular channel 34 in its related clutch element 23, whereby it is operable by swinging movement to shift said clutch element. Moreover, each arm 33 has extending upwardly therefrom a rod 35 over which is engaged a tube 36 which constitutes a handle for swinging said arm.

Each tube 36 is vertically slidable relative to its related rod 35 and has projecting therefrom, near its lower end, a fin 37 for engagement in any one of three slots 38 which are formed in and open through the tops of flanges 39 which rise from each casting 26 adjacent to the recess 31 therein. By lifting either tube 36, its fin 37 may be disengaged from any given slot 38 and then may be swung to swing its related arm 33 to shift the related clutch element 23 either to its neutral position or to a position coupling the drive member 15 with either the related cable drum 16 or the related wheel hub element 19. By then rotating either tube 36 to aline its fin 37 with a selected slot 38 and by then lowering said tube to engage its fin 37 in the selected slot, said tube and, hence, the related arm 33 may be latched in a position to hold the related clutch element 23 against being shifted from either its neutral position or its position coupling the drive member 23 with either the related cable drum 16 or the related hub element 19. In other words, the three slots 38 of each set are positioned, respectively, to correspond to the three different operative angular positions of the related tube 36 whereby the related clutch element 23 may be latched in any one of its three different operative positions.

At the outer side of each cable drum 16 is a brake drum formation 39 with which cooperates a brake band 40, while at the inner side of each hub element 19 is a brake drum formation 41 with which cooperates a brake band 42. Journaled in each casing 26 and in bearing members 43 fastened to the cross member 29 are two short cross shafts 44 and 45 to the first of which the related brake band 40 is anchored at one end and to the second of which the related brake band 42 is anchored at one end. The other end of the first mentioned brake band 40 is suitably connected to the second mentioned shaft 45 to be tightened and released by rotation of said second mentioned shaft. Likewise, the other end of the second mentioned brake band 42 is suitably connected to the first mentioned shaft 44 to be tightened and released by rotation of said first mentioned shaft. The said shafts 44 and 45 are provided with levers 46 for either hand or foot operation, or one for hand operation and the other for foot operation by the driver of the tractor to actuate the brake bands 40 and 42. Thus, rotation of the drums 16 and of the tractor wheels 11 may readily be controlled.

Cables 47 are wound upon the drums 16 and may be used in any desired manner for any desired purpose. In this connection the tractor A preferably is equipped at its front end with a boom 48 to which either or both of the cables 47 may lead to adapt the tractor for various different lifting operations.

As will be apparent from the foregoing, the two cables 47 may be used either simultaneously or individually at any time for any desired purpose. As will also be apparent, the tractor wheels 11 may be driven either simultaneously or individually at any time, and whenever the cable at one side of the tractor is being used for any desired purpose, the tractor wheel at the other side of the tractor may be driven to assist in the accomplishment of that purpose.

Obviously, a tractor equipped with either a single or a pair of power take-off devices in accordance with the invention is highly advantageous for use in many different kinds of operations such as logging, farming, contracting and the like. Obviously, too, it is highly advantageous to employ the usual power transmission gear of a tractor for operation of power take-off devices as in the present instance, and to have the power take-off devices mounted as shown, particularly inwardly with respect to the tractor rear wheels, where they are protected and when in use result in the least turning effect being imposed upon the tractor and do not increase the over-all width of the tractor.

From the foregoing description considered in connection with the accompanying drawings, it is believed that the construction and operation of the present power take-off devices will be clearly understood and their advantages appreciated. It is desired to point out, however, that while only a single, specific structural embodiment of the invention has been illustrated and described, the same is readily capable of specifically different structural embodiments within its spirit and scope as defined in the appended claims.

I claim:

1. In a tractor having a rear drive wheel, a live rear axle, and a housing for said axle, a cable drum rotatably mounted upon said housing concentrically with respect to said axle, a drive member fixed to said axle and having said wheel mounted thereon for rotation with respect thereto, said drive member cooperating with said cable drum to maintain the latter axially alined with said wheel, and clutch means drivably connected constantly with said drive member, and operable to drivably connect and disconnect either said wheel or said drum with and from said drive member.

2. In a tractor having a rear drive wheel, a live rear axle, and a housing for said axle, a cable drum rotatably mounted upon said housing concentrically with respect to said axle, a drive member fixed to said axle and having said wheel mounted thereon for rotation with respect thereto, said drive member cooperating with said cable drum to maintain the latter axially alined with said wheel, and a clutch element splined to said drive member and operable by longitudinal movement relative to said drive member to drivably connect and disconnect either said wheel or said drum with and from said drive member.

3. In a tractor having a rear drive wheel, a live rear axle, and a housing for said axle, a cable drum rotatably mounted upon said housing concentrically with respect to said axle, a drive member fixed to said axle and having said wheel mounted thereon for rotation with respect thereto, a clutch element splined to said drive member and operable by longitudinal movement relative to said drive member to drivably connect and disconnect either said wheel or said drum with and from said drive member, and a fixed casing for said clutch element interposed between and cooperating with said drum and said wheel to maintain the latter axially alined with each other.

4. In a tractor having a rear drive wheel, a live rear axle, and a housing for said axle, a cable drum rotatably mounted upon said housing concentrically with respect to said axle, a drive member fixed to said axle and having said wheel mounted thereon for rotation with respect thereto, a clutch element splined to said drive member and operable by longitudinal movement relative to said drive member to drivably connect and disconnect either said wheel or said drum with and from said drive member, friction brake means for said wheel, and other friction brake means for said drum.

5. In a tractor having at each side thereof a rear drive wheel, a live rear axle, and a housing for said axle, separate cable drums concentric with and rotatably mounted upon said housings, respectively, separate drive members fixed to said axles, respectively, and having said wheels rotatably mounted thereon, respectively, separate clutch elements splined to said drive members, respectively, and each operable by longitudinal movement thereof relative to its related drive member to drivably connect and disconnect either the related wheel or drum with and from the related drive member, separate casings for said clutch elements, a cross member connecting said casings together, connections between said casings and the tractor frame holding said casings against rotation and transmitting to the tractor frame strains resulting from cable operations by said drums, and shifting means for said clutch elements carried by said casings.

6. In a tractor having at each side thereof a rear drive wheel, a live rear axle, and a housing for said axle, separate cable drums concentric with and rotatably mounted upon said housings, respectively, separate drive members fixed to said axles, respectively, and having said wheels rotatably mounted thereon, respectively, separate clutch elements splined to said drive members, respectively, and each operable by longitudinal movement thereof relative to its related drive member to drivably connect and disconnect either the related wheel or drum with and from the related drive member, separate casings for said clutch elements, a cross member connecting said casings together, connections between said casings and the tractor holding said casings against rotation and transmitting to the tractor frame strains resulting from cable operations by said drums, shifting means for said clutch elements carried by said casings, a pair of shafts related to each cable drum and wheel, the shafts of each pair being journaled in the related casing, bearings carried by said cross member and wherein said shafts also are journaled, brake drums fixed to said wheels and to said cable drums, respectively, brake bands for said brake drums operatively connected to said shafts, respectively, and levers connected to said shafts for rotating the latter to engage and disengage said brake bands with and from said brake drums.

7. In a tractor having a rear drive wheel, a live rear axle, and a housing for said axle, a cable drum rotatably mounted upon said housing concentrically with respect thereto, a drive member fixed to said axle, a hub element rotatably mounted upon said drive member and having said wheel fixed thereto, a clutch element splined to said drive member and operable by longitudinal movement relative to said drive member to drivably connect and disconnect the latter with and from either said cable drum or said hub element, a fixed casing enclosing said clutch element and cooperating with said cable drum and said hub element to maintain the same alined with each other, an arm pivoted to said casing for shifting said clutch element, a rod fixed with respect to said arm, a tube slidably and rotatably mounted on said rod and constituting a handle for operation through said rod to swing said arm to shift said clutch element, a fin on said tube, and formations on said casing having slots therein to accommodate said fin to hold said handle and said clutch element in different operative positions.

8. In a tractor having a rear drive wheel, a live rear axle, and a housing for said axle, a cable drum rotatably mounted upon said housing concentrically with respect to said axle, a drive member fixed to said axle and having said wheel mounted upon the outer end portion thereof for rotation with respect thereto, the inner end portion of said drive member extending over and being journaled upon the outer end portion of said housing and extending into and having the outer end portion of said cable drum journaled thereon to insure axial alinement of said cable drum with said wheel, and clutch means drivably connected constantly with said drive member and operable to drivably connect and disconnect either said wheel or said drum with and from said drive member.

JULIUS HELLER.

REFERENCES CITED

The following references are of record in the file of this patent:

UNITED STATES PATENTS

| Number | Name | Date |
| --- | --- | --- |
| 1,399,344 | Haubert | Dec. 6, 1921 |

FOREIGN PATENTS

| Number | Country | Date |
| --- | --- | --- |
| 312,600 | Italy | Nov. 20, 1933 |